United States Patent
Saito et al.

(10) Patent No.: US 11,654,693 B2
(45) Date of Patent: May 23, 2023

(54) INK JET RECORDING METHOD AND INK JET RECORDING APPARATUS

(71) Applicant: CANON KABUSHIKI KAISHA, Tokyo (JP)

(72) Inventors: Takashi Saito, Kanagawa (JP); Tomohiro Yamashita, Kanagawa (JP); Arihiro Saito, Saitama (JP); Maki Motomura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/541,507

(22) Filed: Dec. 3, 2021

(65) Prior Publication Data
US 2022/0176709 A1 Jun. 9, 2022

(30) Foreign Application Priority Data

Dec. 8, 2020 (JP) .............................. JP2020-203432
Nov. 15, 2021 (JP) .............................. JP2021-185394

(51) Int. Cl.
| | | |
|---|---|---|
| *B41J 2/21* | (2006.01) | |
| *C09D 11/322* | (2014.01) | |
| *C09D 11/40* | (2014.01) | |

(52) U.S. Cl.
CPC .............. *B41J 2/211* (2013.01); *B41J 2/2103* (2013.01); *B41J 2/2107* (2013.01); *C09D 11/322* (2013.01); *C09D 11/40* (2013.01)

(58) Field of Classification Search
CPC ........ B41J 2/211; B41J 2/2103; B41J 2/2107; C09D 11/322; C09D 11/40
See application file for complete search history.

(56) References Cited

U.S. PATENT DOCUMENTS

| | | |
|---|---|---|
| 7,160,372 B2 | 1/2007 | Yoshizawa et al. |
| 7,226,498 B2 | 6/2007 | Yamashita et al. |
| 7,247,194 B2 | 7/2007 | Okamura et al. |
| 7,270,701 B2 | 9/2007 | Jinnou et al. |
| 7,297,197 B2 | 11/2007 | Jinnou et al. |
| 7,550,037 B2 | 6/2009 | Mafune et al. |
| 7,611,571 B2 | 11/2009 | Yamashita et al. |

(Continued)

FOREIGN PATENT DOCUMENTS

| | | | | |
|---|---|---|---|---|
| JP | 2009137861 A | * | 6/2009 | ............. A01N 25/04 |
| JP | 2013-253230 A | | 12/2013 | |

(Continued)

*Primary Examiner* — Yaovi M Ameh
(74) *Attorney, Agent, or Firm* — Venable LLP

(57) ABSTRACT

Provided is an ink jet recording method by which even when a multicolor image is recorded with an ink jet recording apparatus including an ink storage portion having an ink inlet port arranged in its upper portion by applying a plurality of aqueous inks each comprising a pigment to a recording medium, an image excellent in abrasion resistance can be stably recorded over along time period. The method is an ink jet recording method for recording an image on a recording medium with an ink jet recording apparatus including: a plurality of aqueous inks each comprising a pigment; an ink storage portion; a recording head; and an ink supply path. The aqueous inks include a first ink to be applied earlier to the recording medium and a second ink to be applied later to the recording medium, and the first ink has a redispersibility index of 0.90 or more.

5 Claims, 4 Drawing Sheets

(56) References Cited

U.S. PATENT DOCUMENTS

| | | | |
|---|---|---|---|
| 7,918,928 B2 | 4/2011 | Saito et al. | |
| 8,075,126 B2 | 12/2011 | Yoshizawa et al. | |
| 8,389,600 B2 | 3/2013 | Suzuki et al. | |
| 8,469,504 B2 | 6/2013 | Saito et al. | |
| 8,616,695 B2 | 12/2013 | Mori et al. | |
| 8,857,967 B2 | 10/2014 | Saito et al. | |
| 8,871,013 B2 | 10/2014 | Sakai et al. | |
| 8,932,394 B2 | 1/2015 | Kudo et al. | |
| 8,986,435 B2 | 3/2015 | Saito et al. | |
| 8,992,674 B2 | 3/2015 | Ikegami et al. | |
| 8,998,397 B2 | 4/2015 | Mori et al. | |
| 9,371,461 B2 | 6/2016 | Saito et al. | |
| 9,453,138 B2 | 9/2016 | Shimizu et al. | |
| 9,562,165 B2 | 2/2017 | Mori et al. | |
| 9,895,901 B2 | 2/2018 | Saito et al. | |
| 10,240,053 B2 | 3/2019 | Nushiro et al. | |
| 10,280,326 B2 | 5/2019 | Saito et al. | |
| 10,479,082 B2 | 11/2019 | Nakagawa et al. | |
| 10,562,305 B2 | 2/2020 | Saito et al. | |
| 10,563,076 B2 | 2/2020 | Saito et al. | |
| 2006/0103705 A1 | 5/2006 | Yoshizawa et al. | |
| 2010/0034972 A1 | 2/2010 | Mukae et al. | |
| 2014/0168314 A1 | 6/2014 | Moribe et al. | |
| 2014/0292895 A1* | 10/2014 | Nagano | C09D 11/326 347/100 |
| 2016/0280945 A1 | 9/2016 | Mukae et al. | |
| 2016/0355019 A1* | 12/2016 | Negishi | B41J 2/195 |
| 2020/0198358 A1 | 6/2020 | Uchida | |
| 2022/0024218 A1 | 1/2022 | Yamashita et al. | |
| 2022/0024219 A1 | 1/2022 | Motomura et al. | |

FOREIGN PATENT DOCUMENTS

| | | | |
|---|---|---|---|
| JP | 2017-209785 A | 11/2017 | |
| JP | 2018-083414 A | 5/2018 | |
| JP | 2018-150518 A | 9/2018 | |
| JP | 2020-100758 A | 7/2020 | |
| WO | WO-2006016636 A1 * | 2/2006 | C09D 11/322 |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

An ink jet recording method is a method including converting input image data into an output image with an ink that is a liquid, and the method is a method including: ejecting the ink from a fine ejection orifice of a recording head; and applying the ink to a recording medium to record an image. According to the ink jet recording method, images, such as a photograph and a document, can be recorded on various recording media. In addition, investigations have been made on various inks, such as: an ink suitable for recording a photographic quality image on a recording medium having a coating layer, such as glossy paper; and an ink suitable for recording a document or the like on a recording medium free of any coating layer, such as plain paper.

In recent years, the ink jet recording method has also been utilized in the recording of, for example, a business document including a letter, a chart or the like through use of plain paper or the like as a recording medium. Accordingly, the frequency at which the method is used in such application has been increasing. In such application, a pigment ink is often utilized because an ink to be used in the application is required to be capable of recording an image that has a high density and is excellent in water resistance. Further, the achievement of high productivity through an increase in number of sheets on which images can be recorded has been required. To cope with those requirements, the volume of an ink storage portion for supplying an ink to the recording head tends to increase. Further, the following ink storage portion has been used. An ink can be replenished (filled) from an ink supply port present in the upper portion of the ink storage portion into the portion without the replacement of the ink storage portion.

In addition, there is a strong need for the downsizing of an ink jet recording apparatus because of, for example, a restriction on a site where the apparatus is placed. Under such circumstances, there is a proposal of the application of an ink containing a pigment to an ink jet recording apparatus mounted with a large-volume ink storage portion (Japanese Patent Application Laid-Open No. 2017-209785 and Japanese Patent Application Laid-Open No. 2020-100758).

SUMMARY OF THE INVENTION

The inventors of the present invention have investigated an ink jet recording apparatus including a large-volume main tank storing each of a plurality of aqueous inks each containing a pigment as a coloring material with a view to recording an image improved in water resistance while improving productivity. Specifically, the inventors have recorded images on various recording media with an ink jet recording apparatus having a configuration proposed in each of Japanese Patent Application Laid-Open No. 2017-209785 and Japanese Patent Application Laid-Open No. 2020-100758, the recording apparatus including a large-volume main tank having an ink inlet port arranged in its upper portion. As a result, the inventors have found that the use of the ink jet recording apparatus having the configuration can record an image excellent in color developability and fastness property.

Further, the inventors of the present invention have performed the same evaluation after leaving the ink jet recording apparatus having the configuration to stand for a long time period. As a result, the inventors have revealed that in particular, a multicolor (secondary color) image recorded on a recording medium having a coating layer, such as glossy paper, is liable to peel from the recording medium even after the lapse of from about 5 minutes to about 15 minutes from ink application, thereby resulting in insufficient abrasion resistance of the image.

Accordingly, an object of the present invention is to solve a problem occurring when a multicolor image is recorded with an ink jet recording apparatus including an ink storage portion having an ink inlet port arranged in its upper portion by applying a plurality of aqueous inks each containing a pigment to a recording medium. That is, the object is to provide an ink jet recording method by which even when the ink jet recording apparatus is used, an image excellent in abrasion resistance can be stably recorded over a long time period. In addition, another object of the present invention is to provide an ink jet recording apparatus to be used in the ink jet recording method.

That is, according to the present invention, there is provided an ink jet recording method for recording an image with an ink jet recording apparatus including: a plurality of aqueous inks each comprising a pigment; an ink storage portion having an ink inlet port arranged in an upper portion thereof, the ink storage portion being configured to store each of the aqueous inks; a recording head having formed therein an ejection orifice configured to eject the aqueous ink supplied from the ink storage portion; and an ink supply path configured to supply the aqueous ink from the ink storage portion to the recording head, the recording being performed by applying the aqueous ink ejected from the ejection orifice to a recording medium, wherein the aqueous inks include a first ink to be applied earlier to the recording medium and a second ink to be applied later to the recording medium so as to overlap at least part of a region in the recording medium having applied thereto the first ink, and wherein the first ink has a redispersibility index calculated by the following equation (1) of 0.90 or more:

$$\text{redispersibility index} = B/A \quad (1)$$

where A represents a mass (g) of a first residue obtained by leaving 2.0 g of the first ink to stand under an environment at 30° C. and a relative humidity of 10% for 16 hours and B represents a mass (g) of a second residue obtained by adding 1.2 g of the first ink to the first residue, stirring the mixture for 30 seconds, leaving the mixture at rest for 60 seconds and then removing a component having flowability.

According to the present invention, the problem occurring when the multicolor image is recorded with the ink jet recording apparatus including the ink storage portion having the ink inlet port arranged in its upper portion by applying the plurality of aqueous inks each containing the pigment to the recording medium can be solved. That is, according to the present invention, the ink jet recording method by which even when the ink jet recording apparatus is used, an image excellent in abrasion resistance can be stably recorded over a long time period can be provided. In addition, according to the present invention, the ink jet recording apparatus to be used in the ink jet recording method can be provided.

Further features of the present invention will become apparent from the following description of exemplary embodiments with reference to the attached drawings.

DESCRIPTION OF THE EMBODIMENTS

Figure 1:
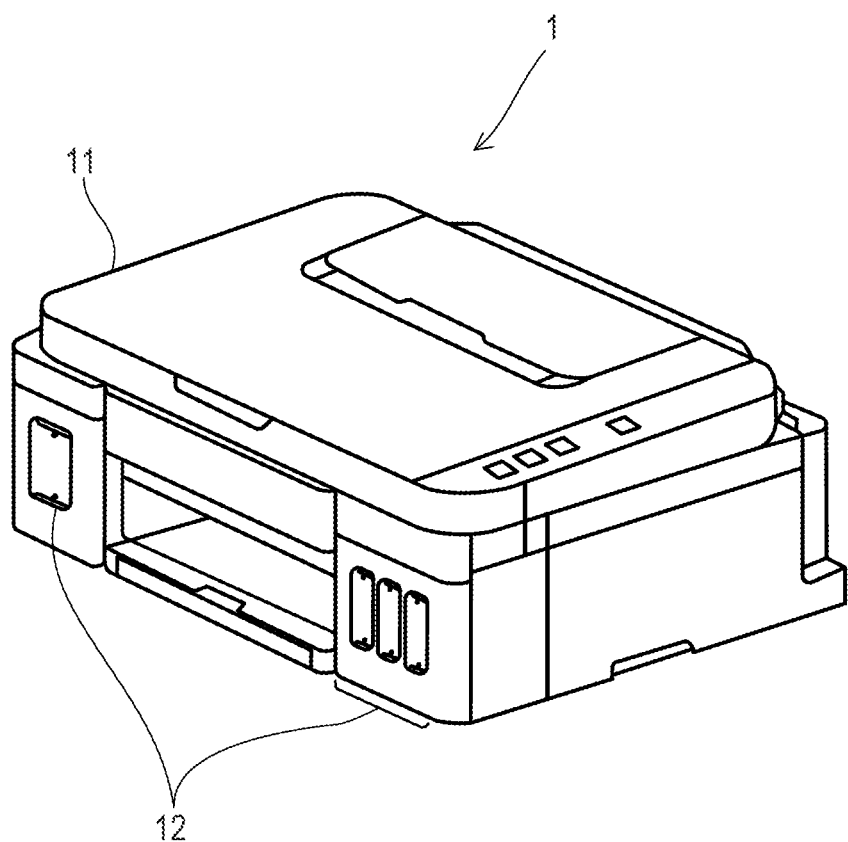
FIG. 1 is a perspective view for schematically illustrating the appearance of an ink jet recording apparatus according to an embodiment of the present invention.

The present invention is described in more detail below by way of exemplary embodiments. In the present invention, when a compound is a salt, the salt is present as dissociated ions in an ink, but the expression "contain a salt" is used for convenience. In addition, an aqueous ink for ink jet is sometimes referred to simply as "ink". Physical property values are values at normal temperature (25° C.), unless otherwise stated. An ink storage portion having a relatively large volume, the portion being placed in the main body of an ink jet recording apparatus, is sometimes described as a "main tank," and an ink storage portion having a relatively small volume is sometimes described as a "sub tank."

First, the inventors of the present invention have prepared an ink jet recording apparatus including a main tank, which is a large-volume ink storage portion, and have filled each of a plurality of aqueous inks each containing a pigment as a coloring material into the main tank. Then, the inventors have recorded secondary color images with the ink jet recording apparatus immediately after the inlet of the inks and after the lapse of a long time period from the inlet of the inks under the same conditions, and have compared the images. At this time, glossy paper that was a recording medium having a coating layer was used. As a result, the inventors have revealed that the color developability of the image recorded after the lapse of the long time period from the inlet of the inks may be improved. The color developability of the image was improved probably because the pigment was settled by the lapse of the long time period to increase the pigment concentration of the ink present in the lower portion of the main tank. In other words, it is assumed that the image recorded after the lapse of the long time period has a pigment layer for forming the image thicker than that of the image recorded immediately after the filling of the ink, thereby reducing its scratch resistance. In particular, in the case of a secondary color image having a large ink application amount, its pigment layer may be peeled even by such an abrasion that the layer is touched with a finger.

Next, the inventors of the present invention have made a detailed investigation on the configuration of an ink storage portion. Specifically, the inventors have prepared a related-art tank of a replacement system and main tanks having different volumes, and have filled inks into the tanks and left the tanks to stand for a long time period, followed by the comparison of the pigment concentrations of the inks present in the lower portions of the ink storage portions. As a result, the inventors have found that when the pigment concentrations of the inks present in the lower portions of the ink storage portions are compared while the time periods for which the tanks are left to stand are uniformized, no large difference occurs between the concentrations, though a slight difference occurs therebetween depending on the shapes (aspect ratios, that is, ratios between base areas and heights) of the ink storage portions. However, the inventors have found that when a change in pigment concentration of the ink extracted from the lower portion of each of the ink storage portions is observed, as the volume of the ink storage portion becomes larger, the amount of the ink required to consume an increase from the pigment concentration before the standing increases. That is, in the case of the related-art tank of a replacement system, the pigment is settled, but the amount of the ink increased in pigment concentration is small as compared to those of the main tanks having large volumes. Accordingly, the concentration of the ink in the tank is immediately returned to an average pigment concentration before the standing by discharge or recording with ease. In addition, in the case of each of the main tanks having large volumes, the abrasion resistance of an image to be recorded reduces probably because the amount of the ink to be consumed until its concentration returns to the average pigment concentration before the standing is large. The sedimentation of the pigment in each of the ink storage portions can be alleviated by, for example, incorporating a stirring mechanism into the ink storage portion. However, the incorporation of the stirring mechanism causes a demerit in that a recording apparatus increases in size.

In view of the foregoing, the inventors of the present invention have made a further investigation with a view to stably recording an image excellent in abrasion resistance over a long time period even when a large-volume main tank having an ink inlet port arranged in its upper portion and a plurality of aqueous inks each containing a pigment are combined. Specifically, the inventors have observed the permeation behavior of an ink droplet at the time of the recording of a secondary color image with an ink jet recording apparatus including a large-volume ink tank having filled thereinto each of the plurality of aqueous inks each containing the pigment. When one ink droplet is applied to a recording medium, a liquid component in the applied ink immediately permeates into the recording medium and a pigment layer is formed on the surface of the recording medium by a component insoluble in the liquid, such as the pigment. After that, when second, third, . . . ink droplets are applied in an overlapping manner to the recording medium, a time period required for the permeation of the liquid component becomes gradually longer. When a multicolor image, such as a secondary color image, is recorded, an ink application amount per unit area increases. Accordingly, the pigment layer on the recording medium immediately after the recording is in a wet state and a binding force between the pigments is weak. Accordingly, the abrasion resistance of the image is low. In addition, the abrasion resistance gradually becomes higher probably because as a time elapses, the liquid component permeates into the recording medium and the pigment layer dries.

The inventors of the present invention have made an investigation on a requirement for the shortening of the wet state of a pigment layer (image) on a recording medium immediately after recording with a view to stably recording an image excellent in abrasion resistance over a long time period even when an ink application amount is large. As a result, the inventors have found that when an ink having a redispersibility index of 0.90 or more is applied earlier to the recording medium, a multicolor image excellent in abrasion resistance can be stably recorded over a long time period. As described above, the pigment layer on the recording medium immediately after the recording is in a wet state. A pigment in the ink applied earlier to the recording medium gradually aggregates on the recording medium along with the permeation and drying of a liquid component in the ink. However, the aggregated pigment is redispersed by the liquid component of an ink applied later. That is, when a multicolor image is recorded, the aggregation and redispersion of the pigment may occur.

The redispersibility index of an ink is defined as described below. First, the mass A (g) of an ink residue (first residue) obtained by leaving 2.0 g of the ink to stand under an environment at 30° C. and a relative humidity of 10% for 16 hours is measured. Next, 1.2 g of the ink is added to the resultant ink residue (first residue), and the mixture is stirred for 30 seconds and left at rest for 60 seconds. After that, the mass B (g) of an ink residue (second residue) obtained by removing a component having flowability is measured. Then, the value of the ratio (B/A) of the mass B (g) of the second residue to the mass A (g) of the first residue is defined as the redispersibility index of the ink.

An ink having a large value of a redispersibility index is hardly redispersed once its pigment aggregates. When the ink (first ink) to be applied earlier to the recording medium has a redispersibility index of 0.90 or more, even in the case where the ink (second ink) is applied afterward, the pigment in the first ink that has aggregated on the recording medium is not easily redispersed. Probably as a result of the foregoing, even when a multicolor image is recorded with an ink increased in pigment concentration by being left to stand for a long time period, an image excellent in abrasion resistance can be recorded.

<Ink Jet Recording Method and Ink Jet Recording Apparatus>

An ink jet recording method of the present invention includes a step of recording an image on a recording medium with an ink jet recording apparatus including: a plurality of aqueous inks each containing a pigment; an ink storage portion; a recording head having formed therein ejection orifices configured to eject the aqueous inks; and an ink supply path. The ink storage portion is a member having an ink inlet port arranged in its upper portion, the member being configured to store each of the plurality of aqueous inks. The recording head has formed therein the ejection orifices each configured to eject the aqueous ink supplied from the ink storage portion. The ink supply path is a member, such as a tube, configured to supply the aqueous ink from the ink storage portion to the recording head. The ink jet recording method of the present invention includes the step of recording an image by applying the aqueous inks ejected from the ejection orifices of the recording head to a recording medium. The plurality of aqueous inks include a first ink to be applied earlier to the recording medium and a second ink to be applied later to the recording medium so as to overlap at least part of a region in the recording medium having applied thereto the first ink. In addition, the first ink has a redispersibility index calculated by the following equation (1) of 0.90 or more: redispersibility index= B/A ... (1) where A represents a mass (g) of a first residue obtained by leaving 2.0 g of the first ink to stand under an environment at 30° C. and a relative humidity of 10% for 16 hours and B represents a mass (g) of a second residue obtained by adding 1.2 g of the first ink to the first residue, stirring the mixture for 30 seconds, leaving the mixture at rest for 60 seconds and then removing a component having flowability.

In addition, an ink jet recording apparatus of the present invention includes: a plurality of aqueous inks each containing a pigment; an ink storage portion; a recording head having formed therein ejection orifices configured to eject the aqueous inks; and an ink supply path. The ink storage portion is a member having an ink inlet port arranged in its upper portion, the member being configured to store each of the plurality of aqueous inks. The recording head has formed therein the ejection orifices each configured to eject the aqueous ink supplied from the ink storage portion. The ink supply path is a member, such as a tube, configured to supply the aqueous ink from the ink storage portion to the recording head. The plurality of aqueous inks include a first ink to be applied earlier to the recording medium and a second ink to be applied later to the recording medium so as to overlap at least part of a region in the recording medium having applied thereto the first ink. In addition, the first ink has a redispersibility index calculated by the equation (1) of 0.90 or more.

(Ink Jet Recording Apparatus)

An embodiment of the present invention is described below with reference to the drawings. In the respective drawings, the same numeral is applied to members having the same function and their description may be omitted. FIG. 1 is a perspective view for schematically illustrating the appearance of an ink jet recording apparatus according to an embodiment of the present invention. An ink jet recording apparatus 1 of the embodiment illustrated in FIG. 1 includes a housing 11 and ink storage containers 12 each having a large volume to be arranged in the housing 11. The ink storage containers 12 have stored (filled) therein inks that are liquids to be applied to a recording medium.

Figure 2:
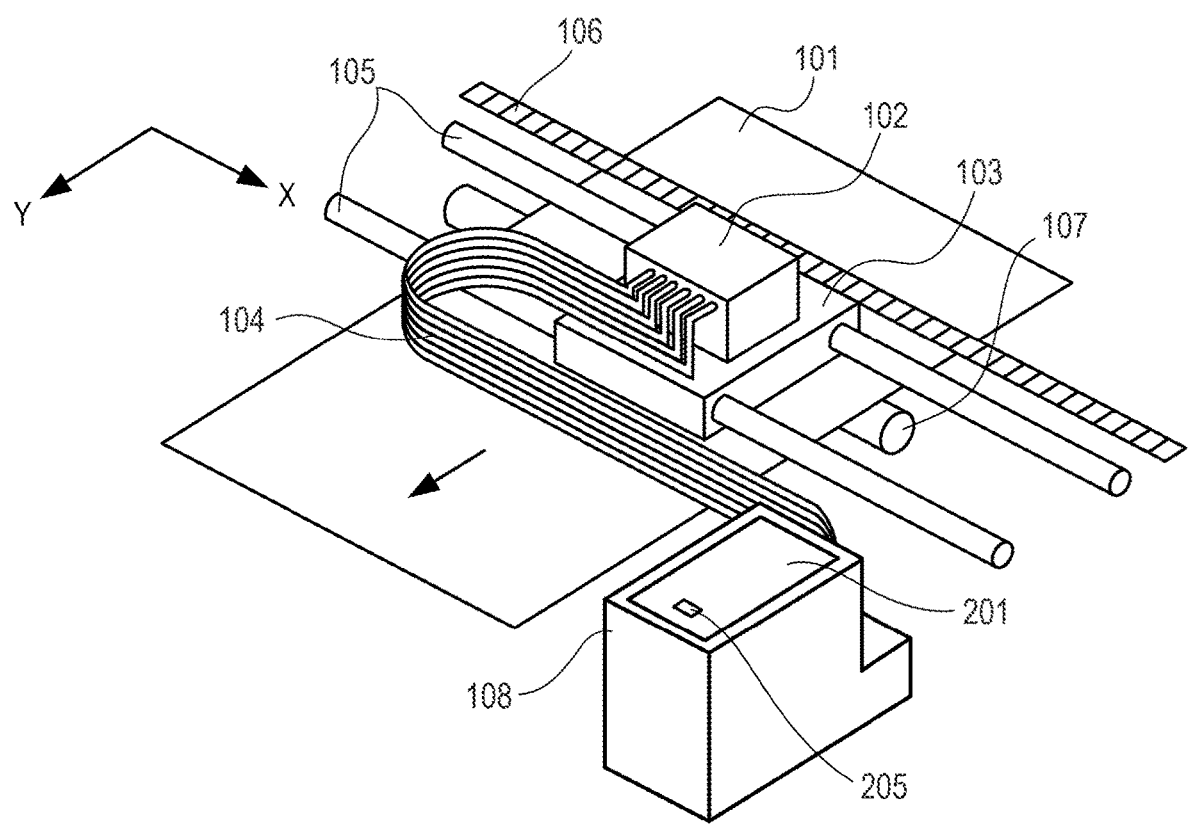
FIG. 2 is a perspective view for schematically illustrating the ink jet recording apparatus according to the embodiment of the present invention.

FIG. 2 is a perspective view for schematically illustrating an ink jet recording apparatus according to an embodiment of the present invention. The ink jet recording apparatus of this embodiment is an ink jet recording apparatus of a so-called serial type for performing a recording operation by reciprocally scanning its recording head in an X direction (main scanning direction). A recording medium 101 is intermittently conveyed by a conveying roller 107 to a Y direction (sub-scanning direction). A recording unit 102 mounted on a carriage 103 is reciprocally scanned in the X direction (main scanning direction) that is a direction perpendicular to the Y direction that is the conveying direction of the recording medium 101. The recording operation is performed by the conveyance of the recording medium 101 in the Y direction and the reciprocal scanning of the recording unit 102 in the X direction. The recording unit 102 includes a recording head 203 (FIG. 3) of an ink jet system for ejecting, from a plurality of ejection orifices, an ink to be supplied and a sub tank 202 (FIG. 3) serving as the second ink storage portion, and the unit is mounted on the carriage 103. The carriage 103 is movably supported along guide rails 105 arranged along the X direction, and is fixed to an endless belt 106 moving in parallel to the guide rails 105. The endless belt 106 is reciprocated by the driving force of a motor to reciprocally scan the carriage 103 in the X direction.

A main tank 201 serving as the first ink storage portion is stored in a main tank storage portion 108. The main tank 201 of the main tank storage portion 108 and the sub tank 202 of the recording unit 102 are connected to each other through an ink supply tube 104 serving as an ink supply path. The ink is supplied from the main tank 201 to the sub tank 202 (FIG. 3) through the ink supply tube 104 and is then ejected from the ejection orifices of the recording head 203. The main tanks 201, the ink supply tubes 104, and the sub tanks 202 may each be arranged in a number corresponding to the kinds of the inks.

An ink inlet port 205 for filling the ink from the outside of the ink jet recording apparatus into the main tank 201 is arranged in the upper portion of the main tank 201. For example, when the ink jet recording apparatus is used for the first time or when an ink amount reduces, the ink is filled from an ink bottle into the main tank in the state of being mounted in the ink jet recording apparatus. In other words, the main tank is firmly installed in the ink jet recording apparatus and the tank itself is not replaced.

Figure 3:
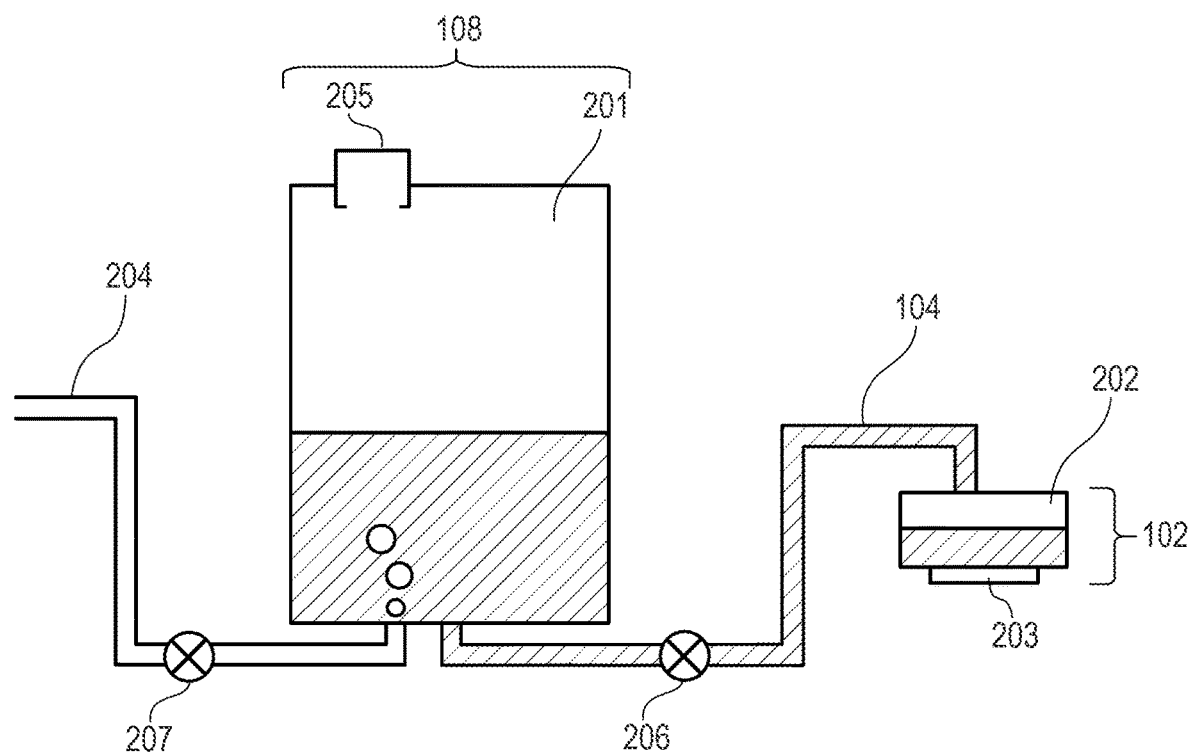
FIG. 3 is a schematic view for illustrating an example of an ink supply system.

FIG. 3 is a schematic view for schematically illustrating an example of an ink supply system. The ink (represented by hatching) stored in the main tank 201 is supplied to the sub tank 202 through the ink supply tube 104 and is then supplied to the recording head 203. A gas introduction tube 204 serving as an air communication portion is connected to the main tank 201. When recording is performed to consume the ink, the ink is supplied from the main tank 201 to the sub tank 202 and hence the amount of the ink in the main tank 201 reduces. In that case, air is introduced from the gas introduction tube 204 one end of which is opened to the air into the main tank 201 to keep an internal negative pressure for holding the ink in the ink supply system substantially constant.

To achieve high productivity through an increase in number of sheets on which images can be recorded, the ink maximum storage amount $V_1$ (mL) of the main tank 201 is preferably increased. Specifically, the ink maximum storage amount $V_1$ (mL) of the main tank 201 is preferably from 60 mL or more to 300 mL or less, more preferably from 100 mL or more to 250 mL or less. In addition, the initial inlet amount of the ink into the main tank 201 is preferably set to up to about 95% with respect to the ink maximum storage amount thereof.

To reduce the frequency at which the ink is supplied from the main tank 201 or to stably supply the ink to the recording head 203, the ink maximum storage amount $V_2$ (mL) of the sub tank 202 is also preferably increased. However, when, for example, a form in which the sub tank 202 is mounted on the carriage 103 is imagined as such a serial type as illustrated in FIG. 1, it is preferred that the ink maximum storage amount $V_2$ (mL) of the sub tank 202 be not excessively increased. That is, when an excessively large amount of the ink is stored in the sub tank 202, an increase in size of the recording unit 102 occurs to reduce the moving speed of the carriage 103 or to cause a need for increasing the strength of the endless belt 106 or the motor for moving the carriage 103. Accordingly, the ink maximum storage amount $V_2$ (mL) of the sub tank 202 is preferably from 1 mL or more to 20 mL or less, more preferably from 2 mL or more to 10 mL or less.

The housings of the main tank 201 and the sub tank 202 are formed of thermoplastic resins, such as: polyester; polycarbonate; polyethylene; polypropylene; polystyrene; polyphenylene ether; and mixtures and modified products thereof. An ink absorbent capable of generating a negative pressure for holding the ink may be arranged in each of the housings. An absorbent obtained by compressing fibers made of, for example, polypropylene or polyurethane is preferred as the ink absorbent. In addition, a form in which the ink is directly reserved in the housing without arrangement of the ink absorbent may be adopted.

The recording unit 102 includes the recording head 203 and the sub tank 202. The following form may be adopted: the sub tank 202 is mounted on the recording unit 102, which is a head cartridge having incorporated thereinto the recording head 203, and the recording unit 102 having mounted thereon the sub tank 202 is mounted on the carriage 103. Further, a form in which the recording unit 102 integrally formed by the sub tank 202 and the recording head 203 is mounted on the carriage 103 may be adopted. The recording unit 102 of a cartridge form in which the sub tank 202 and the recording head 203 are integrally formed as illustrated in FIG. 2 and FIG. 3 out of those forms is preferably mounted on the carriage 103. Further, it is preferred that the housing of the sub tank be formed of a thermoplastic resin and a recording element substrate including the recording head be directly bonded to the sub tank without through intermediation of any other member, such as a heat-radiating plate.

The ink supply tube 104 is connected to the sub tank 202 for forming the recording unit 102 mounted on the carriage 103. Accordingly, the ink supply tube 104 is pulled around in the apparatus following the reciprocal scanning of the carriage 103. Accordingly, a material having such flexibility as to be capable of resisting frequent reciprocal scanning of the carriage 103 needs to be selected and used as a material for forming the ink supply tube 104. Accordingly, the ink supply tube 104 is formed of a resin material.

The ink supply tube is a member obtained by molding the resin material into a tubular shape. The resin material for forming the tube may be a single resin material, or may be a combination of two or more kinds of resin materials. In addition, a resin material blended with various additives may be used. The structure of the tube may be a single-layer structure or a laminated structure. A thermoplastic elastomer is preferred as the resin material because the elastomer is excellent in moldability, rubber elasticity and flexibility. Examples of the thermoplastic elastomer may include an olefin-based resin, a urethane-based resin, an ester-based resin, a styrene-based resin and a vinyl chloride-based resin. Of those, a styrene-based thermoplastic elastomer is preferred because the elastomer is particularly excellent in flexibility and rubber elasticity. Examples of the additives to be blended into the resin material may include a softening agent, a lubricant, a surfactant, an antioxidant, an age inhibitor, a tackifier and a pigment.

The inner diameter and wall thickness of the tube are appropriately set from the viewpoints of, for example, the productivity of the molding or the like thereof, the flexural rigidity thereof when the tube is pulled around in the recording apparatus, the ink supply property thereof and the gas barrier property thereof. The inner diameter of the tube is preferably from 1 mm or more to 5 mm or less, more preferably from 1 mm or more to 3 mm or less. In addition, the wall thickness of the tube is preferably from 0.5 mm or more to 5 mm or less, more preferably from 0.5 mm or more to 3 mm or less.

When the amount of the ink stored in the main tank 201 reduces, a first valve 206 is actuated to close the ink supply tube 104 and then the ink inlet port 205 of the main tank 201 is opened to fill the ink into the main tank 201. When the ink inlet port 205 is opened under a state in which the first valve 206 is not actuated and the ink supply tube 104 is not closed, the negative pressure for holding the ink is lost to leak the ink from an ejection orifice of the recording head 203. In addition, when the ink is filled into the main tank 201, the following configuration may be adopted: the ink inlet port 205 is opened after a second valve 207 has been actuated to close the gas introduction tube 204. With such configuration, the flow of the ink from the main tank 201 toward the gas introduction tube 204 can be blocked. In addition, the leakage of the ink can be more reliably suppressed by actuating the first valve 206 and the second valve 207 in conjunction with each other.

The position at which the ink inlet port 205 is placed is the upper portion of the main tank 201. The upper portion of the main tank 201 is not limited to the upper surface of the main tank 201 illustrated in FIG. 2, and the ink inlet port may be placed at any position, such as a side surface of the tank, as long as the position is present in a region having a height corresponding to more than a half of the ink maximum storage amount of the main tank 201. A form in which the ink is filled from the upper portion of the main tank 201 is excellent in usability. In the case of such form, however, it is difficult to sufficiently stir the ink containing a settled pigment even through convection occurring at the time of the filling of the ink. Accordingly, it is difficult to eliminate the concentration gradient of the pigment as compared to the case where the ink is filled from the lower portion of the main tank.

In the case of a large-size ink jet recording apparatus typified by an apparatus to be used in, for example, an industrial printing application, a measure against the sedimentation of an ink may be taken. Examples of a mechanism for a sedimentation measure may include: a stirring mechanism for flowing the ink in an ink storage portion; an ink-flowing mechanism for flowing the ink in a circulation path going through an ink flow path; and a mechanism for supplying the ink from the upper portion and lower portion of the ink storage portion. In a recording apparatus including such mechanism, a problem to be solved by the present invention does not occur. However, in the case of a small-size ink jet recording apparatus to be used in an office or a home, market demands for the downsizing of the main body of the apparatus and a cost reduction thereof are high. To cope with those demands, a recording apparatus to be used in an office or a home is typically free of any mechanism for a sedimentation measure and the ink jet recording apparatus of the present invention is also free of such mechanism for a sedimentation measure.

Examples of the ink ejection system of the recording head 203 may include a system including applying mechanical energy to the ink and a system including applying thermal energy to the ink. Of those, a system including applying thermal energy to the ink to eject the ink is preferably adopted.

(Recording Step)

The ink jet recording method of the present invention includes the step of recording an image with the above-mentioned ink jet recording apparatus (recording step). In the recording step, specifically, the image is recorded by applying the inks ejected from the ejection orifices of the recording head to the recording medium. Any medium may be used as the recording medium on which the image is to be recorded. Of such media, such sheets of paper each having permeability as described below are preferably used: a recording medium free of any coating layer, such as plain paper or uncoated paper; and a recording medium having a coating layer, such as glossy paper or art paper. In the recording medium free of any coating layer, the pigment of the ink is easily sink down and hence a pigment layer to be formed on the surface of the recording medium easily becomes thin. Accordingly, the problem of abrasion resistance tends to hardly occur. Meanwhile, in the recording medium having the coating layer, the pigment is hardly sink down and hence the pigment layer easily becomes thick. Accordingly, the problem of abrasion resistance is liable to remarkably occur. According to the configuration of the present invention, however, a reduction in abrasion resistance can be effectively suppressed even in the recording medium having the coating layer.

An example of a recording system may be a serial type for recording an image while reciprocally scanning the recording head in a main scanning direction perpendicular to the conveying direction of the recording medium (sub-scanning direction). Another example thereof may be a line system for recording an image while conveying the recording medium (paper) with an elongated recording head (line head) corresponding to the width of the recording medium. To perform a scan delay to be described later, a recording head of a serial type is preferably used. The recording step is described below by taking a case in which the recording head of a serial type is used as an example.

Figure 4:
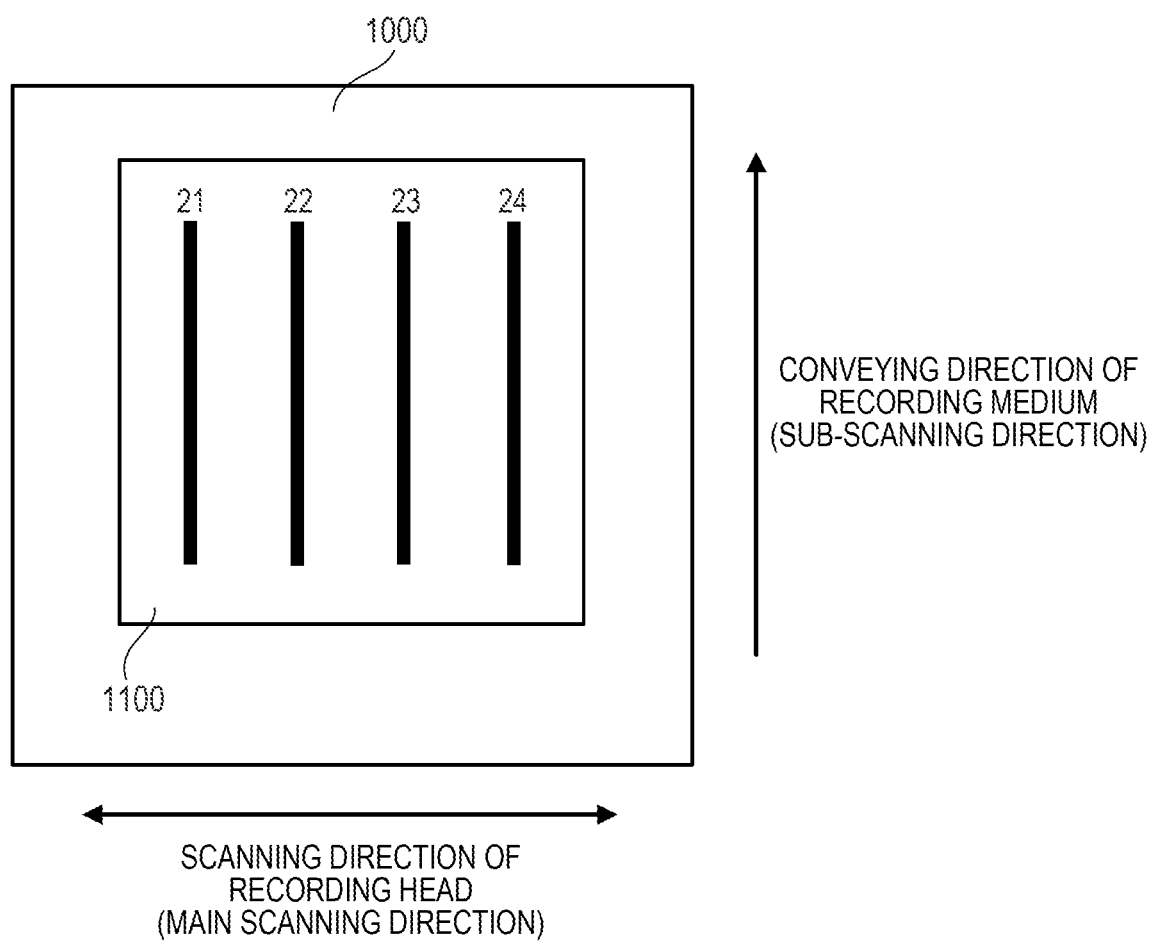
FIG. 4 is a schematic view for illustrating an example of the arrangement of ejection orifice arrays in a recording head.

FIG. 4 is a schematic view for illustrating an example of the arrangement of ejection orifice arrays in the recording head. FIG. 4 is an illustration of a state in which the recording head mounted on the main body of an ink jet recording apparatus is viewed from a recording medium side. As illustrated in FIG. 4, the recording head is formed by connecting, to a base material 1000, a recording element substrate 1100 having arranged therein four ejection orifice arrays 21 to 24. In the illustrated example, a maximum of four kinds of inks can be ejected by filling different kinds of inks into ink supply paths communicating to the respective ejection orifice arrays 21 to 24. In addition, one recording scan can apply, to a unit region on the recording medium, the inks in an overlapping manner in the order in which the ejection orifice arrays are arrayed. An arbitrary region, such as "one pixel" corresponding to the resolution of the recording head, a region obtained by dividing one pixel into an arbitrary number of pieces or "one band" corresponding to a region on which an image can be recorded by one main scan of the recording head, may be set as the unit region.

When the recording head having a configuration illustrated in FIG. 4 is used, the order in which the inks are applied to the recording medium varies depending on the main scanning direction of the recording head. When a recording head whose ejection orifice arrays are asymmetrically arrayed is utilized, recording only needs to be performed only in one main scanning direction because the order in which the inks are applied is important in the ink jet recording method of the present invention. In addition, in order that the order in which the inks are applied may remain unchanged irrespective of the main scanning direction, the ejection orifice arrays only need to be symmetrically arrayed. A recording method including applying the plurality of inks to the unit region on the recording medium with the recording head having a configuration illustrated in FIG. 4 through the same (one) recording scan as described above is referred to as "zero-scan delay recording."

The ink jet recording method of the present invention may be one-pass recording in which an image is recorded on the unit region of the recording medium by one main scan or may be multi-pass recording in which the image is recorded by a plurality of main scans. Of those, multi-pass recording is preferred from the viewpoints of, for example, the permeation and drying of the inks. In addition, a time period from the application of the first ink to the application of the second ink is preferably as long as possible. In addition, when a recording head of a serial type is used, the following so-called "one-scan delay recording" is preferably performed: after the first ink has been applied to the unit region by the first main scan of the recording head, the second ink is applied by the second main scan of the recording head to record an image. In other words, the application of the first ink to the unit region and the application of the second ink thereto are preferably performed by different recording scans. When the scan delay is performed during the time period from the application of the first ink to the application of the second ink, the permeation and drying of the first ink can be further promoted. A method for the scan delay is not limited to the foregoing. For example, when a recording head capable of ejecting inks while dividing its ejection orifice arrays into two or more regions, such as the upstream side and downstream side of its sub-scanning direction, is used, scan delay recording can be performed as described below. An example thereof may be a method including: applying the first ink from a region on the upstream side first through the first main scan of the recording head; conveying the recording medium by a length corresponding to the region after the application; and then applying the second ink from a region on the downstream side through the second main scan of the recording head. Although the number of scans of the scan delay is not particularly limited, the number of scans of the scan delay is preferably 4 or less, more preferably 2 or less because when the number is excessively large, a long time period is required for the recording.

(Aqueous Ink)

The ink jet recording method of the present invention involves using the plurality of aqueous inks and includes the step of recording an image by applying the aqueous inks ejected from the ejection orifices of the recording head to the recording medium. The plurality of aqueous inks are each a pigment ink containing the pigment as a coloring material, and include the first ink to be applied earlier to the recording medium and the second ink to be applied later to the recording medium so as to overlap at least part of the region in the recording medium having applied thereto the first ink. In addition, the first ink has a redispersibility index calculated by the following equation (1) of 0.90 or more. The redispersibility index adopts a value in the range of from 0.00 or more to 3.20 or less.

$$\text{Redispersibility index} = B/A \quad (1)$$

A: The mass (g) of a first residue obtained by leaving 2.0 g of the first ink to stand under an environment at 30° C. and a relative humidity of 10% for 16 hours B: The mass (g) of a second residue obtained by adding 1.2 g of the first ink to the first residue, stirring the mixture for 30 seconds, leaving the mixture at rest for 60 seconds and then removing a component having flowability It is not required that the first ink and the second ink react with each other. In addition, there is no need to perform a step of applying a reaction liquid that may react with the respective inks, a step of applying an active energy ray, such as UV light or an electron beam, or a step of heating the recording medium having applied thereto the inks.

[First Ink]

The first ink is an ink to be applied earlier to the recording medium out of the plurality of aqueous inks. At the time of the measurement and calculation of the redispersibility index of the first ink, the first ink is loaded into an appropriate container and left to stand under predetermined conditions. An open-type container, such as a petri dish, is preferably used as the container into which the first ink is loaded. The stirring to be performed after the addition of the first ink to the first residue is performed by shaking the petri dish with a hand without using any stirring rod or the like because the stirring is an imitation of the contact of the ink in the recording medium. In addition, to remove the component having flowability after the redispersion and still standing of the first residue, the container, such as the petri dish, is preferably tilted. The component having flowability, which adheres to the edge of the container, may be wiped off with paper or the like.

Under the environment (30° C., relative humidity: 10%) under which the first ink is left to stand, the evaporation of the liquid component of the ink easily progresses as compared to a so-called normal-temperature and normal-humidity environment at 25° C. and a relative humidity of 50%. When the first ink is left to stand under such environment for 16 hours, the evaporation of the liquid component considerably progresses. In particular, water is brought into a state in which most of its entire amount has evaporated. The addition of the first ink (that has not evaporated) to the first residue causes the liquid component (mainly water) of the first ink to permeate into the first residue. An ink that is easily redispersed is reduced in redispersibility index because the flowability of the first residue is improved by the water that has permeated thereinto. Meanwhile, an ink that is hardly redispersed is increased in redispersibility index because even the permeation of water into the first residue merely swells the residue and hence the flowability of the first residue does not become higher but remains low. The redispersibility index of the first ink may be evaluated by dropping the second ink to the first residue because it is the second ink that is brought into contact with the first ink in the recording medium. However, the redispersibility index of the first ink only needs to be measured by dropping the first ink to the first residue because the redispersibility of an aqueous ink is dominated by an influence of water that is a main component. Performance concerning abrasion resistance can be simply and appropriately evaluated by the approach. The inventors of the present invention have assumed that the redispersibility index of the first ink measured and calculated as described above reflects such behavior that the first ink is redispersed by the second ink on the recording medium.

The redispersibility index of the first ink is 0.90 or more, preferably 0.95 or more. The upper limit of the redispersibility index of the first ink is preferably 1.30 or less from the viewpoint of suppressing the sticking thereof to the recording head. The redispersibility index of the first ink may be adjusted by, for example, the kind of its pigment, the dispersion system of the pigment, the kind of its water-soluble organic solvent, the amount of the water-soluble organic solvent and the presence or absence of a resin, and the form, physical properties, composition and amount of the resin. The redispersibility index is an indicator of the extent to which the aggregation of the pigment that has aggregated once is loosened by the same ink. Accordingly, the redispersibility index may be reduced by, for example, making it hard for the pigment to aggregate through any one of the above-mentioned approaches or the like, or even when the pigment aggregates, allowing the pigment to easily conform to the liquid component to facilitate the loosening of the aggregation. Of the above-mentioned approaches, the kind of the pigment or the kind of the water-soluble organic solvent has a large influence on the redispersibility index.

[Second Ink]

The second ink is an ink to be applied to the recording medium after the first ink out of the plurality of aqueous inks. The static surface tension ($\gamma_1$) of the first ink and the static surface tension ($\gamma_2$) of the second ink preferably satisfy a relationship of $\gamma_1 > \gamma_2$. The use of the first ink and the second ink whose static surface tensions satisfy the relationship can further accelerate the permeation of the second ink, which is an ink to be applied later, to further improve the abrasion resistance of an image. The static surface tension of the ink can be appropriately controlled by adjusting the kind and amount of a surfactant or the water-soluble organic solvent to be incorporated into the ink. The static surface tension of the ink may be adjusted by using the surfactant and the water-soluble organic solvent in combination. The content (% by mass) of the surfactant in the ink is preferably from 0.1% by mass or more to 5.0% by mass or less, more preferably from 0.5% by mass or more to 1.5% by mass or less with respect to the total mass of the ink. In addition, the redispersibility index of the second ink can be defined in the same manner as in the first ink and is from 0.00 or more to 3.20 or less, preferably from 0.10 or more to 1.30 or less. In addition, the redispersibility index of the first ink is preferably larger than that of the second ink.

[Coloring Material]

The pigment is used as the coloring material. The content (% by mass) of the pigment in the ink is preferably from 0.5% by mass or more to 10.0% by mass or less, more preferably from 1.0% by mass or more to 10.0% by mass or less with respect to the total mass of the ink. Examples of the kind of the pigment may include: inorganic pigments, such as carbon black, calcium carbonate and titanium oxide; and organic pigments, such as an azo pigment, phthalocyanine, quinacridone, isoindolinone, imidazolone, diketopyrrolopyrrole and dioxazine. A dye may be used in combination for the purpose of, for example, toning.

The redispersibility index of the ink may be affected by the kind of the pigment to be used. Of the general-purpose pigments to be used in the aqueous ink for ink jet recording, pigments, such as quinacridone, a quinacridone solid solution, diketopyrrolopyrrole and dioxazine, have such properties as to be liable to aggregate as compared to pigments, such as phthalocyanine, an azo pigment and carbon black. Accordingly, the redispersibility index of the ink using the pigment, such as quinacridone, the quinacridone solid solution, diketopyrrolopyrrole and dioxazine, tends to be large. In addition, those pigments have planar structures and hence the areas of planes attracting each other are large. Further, a strong hydrogen bond is easily formed between the molecules of each of the pigments because the pigments each have an imino group or a carbonyl group in a molecule thereof. Accordingly, it is assumed that the molecules of each of those pigments are strongly stacked on each other with ease and have high aggregation power, thereby increasing the redispersibility index.

The "hue" of the ink means a hue to be classified into, for example, black and colors, and the hue of the color includes cyan, magenta, yellow, red, green and blue. In the case of a black ink, a self-dispersible pigment is preferably used as its coloring material. In addition, in the case of a color ink, a resin-dispersed pigment is preferably used as its coloring material.

The dispersion system of the pigment is not particularly limited. For example, a resin-dispersed pigment dispersed with a resin dispersant, a pigment dispersed with a surfactant and a microcapsule pigment obtained by covering at least part of the particle surface of a pigment with a resin or the like may each be used. In addition, for example, a self-dispersible pigment obtained by bonding functional groups including a hydrophilic group, such as an anionic group, to the particle surface of a pigment and a pigment (resin-bonded self-dispersible pigment) obtained by chemically bonding an organic group containing a polymer to the particle surface of a pigment may each be used. In addition, pigments different from each other in dispersion system may be used in combination.

A product obtained by bonding an anionic group to the particle surface of a pigment directly or through any other atomic group (—R—) may be used as the self-dispersible pigment. Examples of the anionic group may include —COOM, —SO$_3$M and —PO$_3$M$_2$. Ms may each independently represent, for example, a hydrogen atom, an alkali metal, ammonium (NH$_4$) or an organic ammonium. Examples of the other atomic group (—R—) may include an alkylene group, an arylene group, an amide group, a sulfonyl group, an imino group, a carbonyl group, an ester group, an ether group and groups obtained by combining those groups.

The ionic group amount of the self-dispersible pigment is preferably from 0.04 mmol/g or more to 1.00 mmol/g or less. The ionic group amount of the self-dispersible pigment is represented by the number of moles of ionic groups per unit mass of the self-dispersible pigment and can be calculated from a surface charge quantity measured by colloid titration. In Examples to be described later, a potentiometric automatic titrator (product name: "AT-510," manufactured by Kyoto Electronics Manufacturing Co., Ltd.) mounted with a flow potentiometric titration unit (PCD-500) was used. Then, the surface charge quantity of the self-dispersible pigment in a pigment dispersion liquid was measured by colloid titration utilizing a potential difference, followed by the calculation of the ionic group amount. More specifically, the pigment dispersion liquid was diluted to about 300 times (mass basis) with pure water and then the pH of the diluted liquid was adjusted to about 10 with potassium hydroxide as required, followed by the performance of potentiometric titration through use of 5 mmol/L methyl glycol chitosan as a titrant. The ionic group amount can of course be measured with the pigment extracted from the ink by an appropriate method. The redispersibility index of the ink is affected by the ionic group amount of the self-dispersible pigment. The use of a self-dispersible pigment having a large ionic group amount tends to increase the redispersibility index of the ink.

The resin dispersant to be used in the resin-dispersed pigment typically includes a hydrophilic unit having an anionic group and a hydrophobic unit free of any anionic group. The hydrophilic unit is a unit for securing an affinity for an aqueous medium. The hydrophobic unit is a unit for adsorbing to the particle surface of the pigment through a hydrophobic interaction. Examples of the resin-dispersed pigment may include: a pigment of such a type as to be dispersed by causing the resin dispersant to physically adsorb to the particle surface of the pigment; and a microcapsule pigment obtained by covering the particle surface of a pigment with the resin dispersant.

A (meth)acrylic resin including a hydrophilic unit having an anionic group and a hydrophobic unit free of any anionic group is preferably used as the resin dispersant. The hydrophilic unit may be formed by, for example, polymerizing a monomer having an anionic group. Specific examples of the monomer having an anionic group may include: monomers each having a carboxy group, such as (meth)acrylic acid, itaconic acid, maleic acid and fumaric acid; and anhydrides and salts of those monomers. Examples of a cation for forming a salt of the monomer having an anionic group may include a lithium cation, a sodium cation, a potassium cation, an ammonium cation and an organic ammonium cation.

The hydrophobic unit may be formed by, for example, polymerizing a monomer free of any anionic group. Specific examples of the monomer free of any anionic group may include: monomers each having an aromatic group, such as styrene, α-methylstyrene, benzyl (meth)acrylate, 2-vinylpyridine, 4-vinylpyridine and 1-vinylimidazole; and monomers each having an aliphatic group, such as ethyl (meth)acrylate, methyl (meth)acrylate, (iso)propyl (meth) acrylate, (n-, iso-, t-)butyl (meth)acrylate and 2-ethylhexyl (meth)acrylate.

The volume average particle diameter of the pigment in the ink is preferably from 10 nm or more to 300 nm or less, more preferably from 20 nm or more to 200 nm or less. The volume average particle diameter of the pigment may be measured with, for example, a particle diameter-measuring apparatus of a dynamic light scattering system.

[Resin]

The inks each preferably contain a resin. The resin may be added to the ink (i) for stabilizing the dispersed state of the pigment, that is, as a resin dispersant or an aid therefor. In addition, the resin may be added to the ink (ii) for improving the various characteristics of an image to be recorded. The state of the resin in the ink may be the state of being dissolved in an aqueous medium or may be the state of being dispersed as a resin particle in the aqueous medium. The phrase "a resin is water-soluble" as used herein means that when the resin is neutralized with an alkali whose amount is equivalent to its acid value, a particle whose particle diameter may be measured by a measurement method, such as a dynamic light scattering method, is not formed. The content (% by mass) of the resin in the ink is preferably from 0.1% by mass or more to 20.0% by mass or less, more preferably from 0.5% by mass or more to 15.0% by mass or less with respect to the total mass of the ink.

Examples of the resin may include an acrylic resin, a polyester-based resin, a urethane-based resin, a urea-based resin, polysaccharides and polypeptides. Of those, an acrylic resin is preferred from the viewpoints of its ejection characteristics from the ejection orifices of the recording head. A resin including, as constituent units, a unit having an anionic group and a unit free of any anionic group is preferred as the acrylic resin. Examples of the form of the acrylic resin may include a random copolymer, a block copolymer, a graft copolymer and combinations thereof.

Examples of a monomer to be turned into a unit for forming the acrylic resin by its polymerization may include a monomer having an anionic group and a monomer free of any anionic group. In normal cases, the monomer having an anionic group is turned into a hydrophilic unit by its polymerization and the monomer free of any anionic group is turned into a hydrophobic unit by its polymerization.

Examples of the monomer having an anionic group may include: monomers each having a carboxylic acid group, such as (meth)acrylic acid, itaconic acid, maleic acid and fumaric acid; and anhydrides and salts of those monomers. Examples of a cation for forming a salt of the monomer having an anionic group may include a lithium cation, a sodium cation, a potassium cation, an ammonium cation and an organic ammonium cation.

Examples of the monomer free of any anionic group may include: monomers each having an aromatic group, such as styrene, α-methylstyrene, benzyl (meth)acrylate, 2-vinylpyridine, 4-vinylpyridine and 1-vinylimidazole; and (meth)acrylic acid esters, such as ethyl (meth)acrylate, methyl (meth)acrylate, (iso)propyl (meth)acrylate, (n-, iso-, t-)butyl (meth)acrylate and 2-ethylhexyl (meth)acrylate.

The acid value of the resin is preferably from 40 mgKOH/g or more to 300 mgKOH/g or less, more preferably from 100 mgKOH/g or more to 250 mgKOH/g or less. The acid value is particularly preferably from 100 mgKOH/g or more to 200 mgKOH/g or less out of those values. In addition, the weight average molecular weight of the resin is preferably from 3,000 or more to 50,000 or less, more preferably from 5,000 or more to 15,000 or less. The weight average molecular weight of the resin is a value in terms of polystyrene measured by gel permeation chromatography.

The redispersibility index of the ink fluctuates depending on the form (a water-soluble resin or a water-insoluble resin [resin particle]), acid value and weight average molecular weight of the resin. For example, the addition of a resin that stabilizes the dispersed state of the pigment tends to reduce the redispersibility index of the ink. In particular, a block copolymer is effective in stabilizing the dispersed state of the pigment, but the addition of the block copolymer is particularly liable to reduce the redispersibility index of the ink. Meanwhile, when a large amount of a cation derived from, for example, the counterion of the anionic group of the resin, which is not limited to the block copolymer, is incorporated into the ink to destabilize the dispersed state of the pigment, the redispersibility index of the ink tends to increase.

[Aqueous Medium]

The inks are each an aqueous ink containing at least water as an aqueous medium. Water or an aqueous medium that is a mixed solvent of water and a water-soluble organic solvent may be incorporated into the ink. Any one of solvents that can be used in inks for ink jet, such as alcohols, (poly) alkylene glycols, glycol ethers, nitrogen-containing compounds and sulfur-containing compounds, may be used as the water-soluble organic solvent. The content (% by mass) of the water-soluble organic solvent in the ink is preferably from 3.0% by mass or more to 50.0% by mass or less with respect to the total mass of the ink. Deionized water or ion-exchanged water is preferably used as the water. The content (% by mass) of the water in the ink is preferably from 50.0% by mass or more to 95.0% by mass or less with respect to the total mass of the ink.

The redispersibility index of the ink may be adjusted by the kind and addition amount of the water-soluble organic solvent. For example, the addition of a water-soluble organic solvent that stabilizes the dispersed state of the pigment tends to reduce the redispersibility index of the ink. Meanwhile, the addition of a water-soluble organic solvent that destabilizes the dispersed state of the pigment tends to increase the redispersibility index of the ink. To increase the redispersibility index of the ink, a water-soluble organic solvent having a specific dielectric constant of 27.0 or less is preferably used. Examples of the water-soluble organic solvent having a specific dielectric constant of 27.0 or less may include 3-methyl-1,5-pentanediol (23.9), 1,5-pentanediol (27.0), triethylene glycol (22.7), 1,2-hexanediol (14.8), triethylene glycol monobutyl ether (9.8), tetraethylene glycol monobutyl ether (9.4), 1,6-hexanediol (7.1), polyethylene glycol having a number average molecular weight of 200 (18.9), polyethylene glycol having a number average molecular weight of 600 (11.4) and polyethylene glycol having a number average molecular weight of 1,000 (4.6). Numerical values in parentheses applied to the water-soluble organic solvents are the specific dielectric constants of the respective water-soluble organic solvents at 25° C. The addition of only a small amount of polyethylene glycol out of those solvents can efficiently increase the redispersibility index of the ink. The use of polyethylene glycol having a number average molecular weight of 600 or more particularly easily increases the redispersibility index of the ink. Of such glycols, polyethylene glycol having a number average molecular weight of 1,000 may be suitably used in consideration of a balance with an ejection property.

The specific dielectric constant of the water-soluble organic solvent may be measured using a dielectric constant meter (e.g., product name: "BI-870", manufactured by Brookhaven Instruments Corporation) under the condition of a frequency of 10 kHz. A value calculated from the following equation (1) based on the measurement of the specific dielectric constant of a 50% by mass aqueous solution is adopted as the specific dielectric constant of a water-soluble organic solvent that is solid at 25° C. The "water-soluble organic solvent" generally refers to a liquid, but in the present invention, a solvent that is solid at 25° C. (normal temperature) is also included in the water-soluble organic solvent.

$$\varepsilon_{sol} = 2\varepsilon_{50\%} - \varepsilon_{water} \qquad (1)$$

$\varepsilon_{sol}$: Specific dielectric constant of water-soluble organic solvent that is solid at 25° C.
$\varepsilon_{50\%}$: Specific dielectric constant of 50% by mass aqueous solution of water-soluble organic solvent that is solid at 25° C.
$\varepsilon_{water}$: Specific dielectric constant of water As a water-soluble organic solvent that is generally used for an aqueous ink and is solid at 25° C., there may be given, for example, 1,6-hexanediol, trimethylolpropane, ethylene urea, urea and polyethylene glycol having a number average molecular weight of 1,000. Herein, the reason why the specific dielectric constant of the water-soluble organic solvent that is solid at 25° C. is determined from the specific dielectric constant of its 50% by mass aqueous solution is as described below. Some of the water-soluble organic solvents that are solid at 25° C. and may serve as a constituent component of an aqueous ink are difficult to prepare into aqueous solutions having high concentrations of more than 50% by mass. Meanwhile, in an aqueous solution having a low concentration of 10% by mass or less, the specific dielectric constant of water is dominant and hence a probable (effective) value of the specific dielectric constant of the water-soluble organic solvent cannot be obtained. In view of the foregoing, the inventors of the present invention have made an investigation. As a result, the inventors have revealed that aqueous solutions serving as measuring objects can be prepared from most solvents that may be used in inks out of the water-soluble organic solvents that are solid at 25° C., and specific dielectric constants determined from the solutions are consistent with the effects of the present invention. For such reason, the inventors have decided to utilize a 50% by mass aqueous solution. In the case of a water-soluble organic solvent, which is solid at 25° C. but has so low a solubility in water that a 50% by mass aqueous solution cannot be prepared therefrom, the value of a specific dielectric constant calculated in conformity with a case in which the $\varepsilon_{sol}$ is determined through utilization of an aqueous solution having a saturated concentration is used for convenience.

[Surfactant]

The redispersibility index of the ink may be adjusted by the kind and addition amount of a surfactant. For example, the addition of a surfactant that stabilizes the dispersed state of the pigment of the ink tends to reduce the redispersibility index of the ink. Meanwhile, the addition of a surfactant that destabilizes the dispersed state of the pigment tends to increase the redispersibility index of the ink. For example, when the coloring material of the ink is a resin-dispersed pigment, the addition of a large amount of the surfactant to the ink may peel the resin dispersant from the particle surface of the pigment. Accordingly, the redispersibility index of the ink tends to increase. Meanwhile, a surfactant having a structure in which a hydrophilic moiety and a hydrophobic moiety are clearly separated from each other is easily oriented toward the pigment to aid its dispersion. Accordingly, the redispersibility index of the ink tends to reduce. An example of such surfactant may be a polyoxyethylene alkyl ether having an ethylene oxide group that is hydrophilic and an alkyl group that is hydrophobic.

[Other Components]

In addition to the above-mentioned components, various additives, such as an antifoaming agent, a pH adjustor, a viscosity modifier, a rust inhibitor, a preservative agent, a fungicide, an antioxidant and an antireducing agent, may be incorporated into the ink as required. The "other components" each have an insignificant influence on the redispersibility index of the ink because their contents in the ink are small.

[Physical Properties of Inks]

The pH, static surface tension and viscosity of the ink at 25° C. each preferably fall within the following range. The pH of the ink is preferably from 5.0 or more to 10.0 or less, more preferably from 7.0 or more to 9.5 or less. The static surface tension of the ink is preferably from 30 mN/m or more to 50 mN/m or less. The viscosity of the ink is preferably from 2.0 mPa·s or more to 10.0 mPa·s or less.

EXAMPLES

The present invention is described in more detail below by way of Examples and Comparative Examples. The present invention is by no means limited to Examples below without departing from the gist of the present invention. "Part(s)" and "%" with regard to the description of the amounts of components are by mass unless otherwise stated. The acid value of a resin was measured by potentiometric titration including using a potassium hydroxide-methanol titrant. In addition, the weight average molecular weight of the resin is a value in terms of polystyrene measured by gel permeation chromatography (GPC).

<Preparation of Pigment Dispersion Liquid>
(Ionic Group Amount of Self-Dispersible Pigment)

The surface charge quantity of a self-dispersible pigment in a pigment dispersion liquid was measured with a potentiometric automatic titrator mounted with a flow potentiometric titration unit (PCD-500) by potentiometric titration including using 5 mmol/L methyl glycol chitosan as a titrant, followed by the determination of the ionic group amount of the pigment. A product (product name: "AT-510," manufactured by Kyoto Electronics Manufacturing Co., Ltd.) was used as the potentiometric automatic titrator.

(Pigment Dispersion Liquid 1)

A styrene-acrylic acid copolymer (water-soluble resin) having an acid value of 120 mgKOH/g and a weight average molecular weight of 8,000 was prepared. The prepared resin was neutralized with potassium hydroxide whose molar amount was equivalent to its acid value, and the neutralized product was dissolved in ion-exchanged water to prepare an aqueous solution of a resin dispersant having a resin (solid matter) content of 20.0%. A mixture of 15.0 parts of a pigment (C.I. Pigment Blue 15:3), 30.0 parts of the aqueous solution of the resin dispersant and 55.0 parts of water was loaded into a sand grinder and dispersed for 1 hour, followed by centrifugation treatment to remove coarse particles. After the residue had been subjected to pressure filtration through a microfilter having a pore size of 3.0 m (manufactured by FUJIFILM Corporation), an appropriate amount of ion-exchanged water was added to the filtrate to provide a pigment dispersion liquid 1. The resultant pigment dispersion liquid 1 had a pigment content of 10.0% and a resin dispersant content of 4.0%.

(Pigment Dispersion Liquid 2)

A pigment dispersion liquid 2 having a pigment content of 10.0% and a resin dispersant content of 4.0% was obtained by the same procedure as that of the above-mentioned pigment dispersion liquid 1 except that the kind of the pigment was changed to C.I. Pigment Red 122.

(Pigment Dispersion Liquid 3)

A pigment dispersion liquid 3 having a pigment content of 10.0% and a resin dispersant content of 4.0% was obtained by the same procedure as that of the above-mentioned pigment dispersion liquid 1 except that the kind of the pigment was changed to C.I. Pigment Red 150.

(Pigment Dispersion Liquid 4)

A pigment dispersion liquid 4 having a pigment content of 10.0% and a resin dispersant content of 4.0% was obtained by the same procedure as that of the above-mentioned pigment dispersion liquid 1 except that the kind of the pigment was changed to C.I. Pigment Yellow 74.

(Pigment Dispersion Liquid 5)

A solution obtained by dissolving 5.0 g of concentrated hydrochloric acid in 5.5 g of water was brought into the state of being cooled to 5° C., followed by the addition of 1.83 g of 4-aminophthalic acid to the solution under the state. A container containing the solution was loaded into an ice bath, and while the solution was stirred so that its temperature was held at 10° C. or less, a solution obtained by dissolving 1.8 g of sodium nitrite in 9.0 g of ion-exchanged water at 5° C. was added thereto. After the mixture had been stirred for 15 minutes, 6.0 g of carbon black (specific surface area: 220 m$^2$/g, DBP oil absorption: 105 mL/100 g) was added to the mixture under stirring and the whole was further stirred for 15 minutes to provide a slurry. The resultant slurry was filtered with filter paper (product name: "STANDARD FILTER PAPER No. 2," manufactured by Advantec), and particles remaining on the filter paper were sufficiently washed with water and dried in an oven at 110° C. After that, a sodium ion was substituted with a potassium ion by an ion exchange method. Thus, a self-dispersible pigment in which a —$C_6H_3$—$(COOK)_2$ group was bonded to the particle surface of the carbon black was obtained. An appropriate amount of water was added to adjust the content of the pigment. Thus, a pigment dispersion liquid 5 having a pigment content of 10.0% was obtained. The anionic group amount of the self-dispersible pigment in the resultant pigment dispersion liquid 5 was 0.50 mmol/g.

(Pigment Dispersion Liquid 6)

With reference to the description of Japanese Patent Application Laid-Open No. 2013-253230, 0.10 mmol/g of a "phosphonic acid group" derived from ((4-aminobenzoylamino)-methan-1,1-diyl)bisphosphonic acid was introduced into a pigment (C.I. Pigment Blue 15:4). Further, 0.15 mmol/g of a "sulfonic acid group" derived from p-aminobenzenesulfonic acid was introduced into the mixture to prepare a self-dispersible pigment. After that, an aqueous solution of potassium hydroxide and water were added to the pigment to provide a pigment dispersion liquid 6 having a pigment content of 10.0% and a pH of 10.

(Pigment Dispersion Liquid 7)

With reference to the description of Japanese Patent Application Laid-Open No. 2013-253230, 0.10 mmol/g of a "phosphonic acid group" derived from ((4-aminobenzoylamino)-methan-1,1-diyl)bisphosphonic acid was introduced into a pigment (C.I. Pigment Red 122). Thus, a self-dispersible pigment was prepared. After that, an aqueous solution of potassium hydroxide and water were added to the pigment to provide a pigment dispersion liquid 7 having a pigment content of 10.0% and a pH of 10.

(Pigment Dispersion Liquid 8)

With reference to the description of Japanese Patent Application Laid-Open No. 2013-253230, 0.10 mmol/g of a "phosphonic acid group" derived from ((4-aminobenzoylamino)-methan-1,1-diyl)bisphosphonic acid was introduced into a pigment (C.I. Pigment Red 150). Thus, a self-dispersible pigment was prepared. After that, an aqueous solution of potassium hydroxide and water were added to the pigment to provide a pigment dispersion liquid 8 having a pigment content of 10.0% and a pH of 10.

(Pigment Dispersion Liquid 9)

With reference to the description of Japanese Patent Application Laid-Open No. 2013-253230, a self-dispersible pigment was prepared by introducing 0.10 mmol/g of a "sulfonic acid group" derived from p-aminobenzenesulfonic acid into a pigment (C.I. Pigment Yellow 74). After that, an aqueous solution of potassium hydroxide and water were added to the pigment to provide a pigment dispersion liquid 9 having a pigment content of 10.0% and a pH of 10.

<Preparation of Dye Aqueous Solution>

(Dye Aqueous Solution 1)

A dye (C.I. Direct Blue 199) was dissolved in ion-exchanged water and then an acid was added to deposit the dye. The deposited dye was filtered and fractionated to provide a wet cake of the dye of a free acid form. The resultant wet cake was added to ion-exchanged water and an aqueous solution of sodium hydroxide whose amount was equivalent to the anionic groups of the dye was added to neutralize all the anionic groups, thereby dissolving the dye. Further, an appropriate amount of ion-exchanged water was added to the resultant to provide a dye aqueous solution 1 having a dye content of 10.0%.

(Dye Aqueous Solution 2)

A dye aqueous solution 2 having a dye content of 10.0% was obtained by the same procedure as that of the above-mentioned dye aqueous solution 1 except that the dye was changed to C.I. Acid Red 249.

(Dye Aqueous Solution 3)

A dye aqueous solution 3 having a dye content of 10.0% was obtained by the same procedure as that of the above-mentioned dye aqueous solution 1 except that the dye was changed to Direct Yellow 132.

<Preparation of Resin Aqueous Solution>

(Resin Aqueous Solution 1)

A styrene/acrylic acid copolymer (acid value: 120 mgKOH/g, weight average molecular weight: 8,000) was neutralized with an aqueous solution containing potassium hydroxide whose molar amount was equivalent to the acid value, followed by the dissolution of the neutralized product in ion-exchanged water. Thus, a resin aqueous solution 1 having a resin content of 10.0% was prepared.

(Resin Aqueous Solution 2)

A block copolymer having 65.1% of a unit derived from benzyl methacrylate, 18.9% of a unit derived from n-butyl acrylate and 16.0% of a unit derived from acrylic acid was synthesized with reference to the description of Examples of Japanese Patent Application Laid-Open No. 2018-150518. The synthesized block copolymer had an acid value of 124 mgKOH/g and a weight average molecular weight of 12,000. The resultant block copolymer was neutralized with an aqueous solution containing potassium hydroxide whose molar amount was equivalent to the acid value, followed by the dissolution of the neutralized product in ion-exchanged water. Thus, a resin aqueous solution 2 having a resin content of 10.0% was prepared.

(Resin Aqueous Solution 3)

A prepolymer solution was prepared by using 31.6 parts of polypropylene glycol (number average molecular weight: 2,000), 46.9 parts of isophorone diisocyanate and 21.5 parts of dimethylolpropionic acid with reference to the description of Examples of Japanese Patent Application Laid-Open No. 2018-83414. After the acid groups of the prepolymer had been neutralized with potassium hydroxide, 2.1 parts of ethylenediamine was added to perform a chain extension reaction. Thus, a resin aqueous solution 3 containing a urethane resin having an acid value of 90 mgKOH/g and a weight average molecular weight of 30,000 was prepared. The prepared resin aqueous solution 3 had a resin content of 20.0%.

<Preparation of Ink>

Respective components (unit: %) shown in the upper stage of Table 1 were mixed and sufficiently stirred. After that, the mixtures were subjected to pressure filtration through a microfilter having a pore size of 3.0 m (manufactured by FUJIFILM Corporation) to prepare respective inks. In Table 1, the term "Acetylenol E100" represents the product name of a surfactant (ethylene oxide adduct of acetylene glycol) manufactured by Kawaken Fine Chemicals Co., Ltd. At the time of the preparation of the inks, the content of the "Acetylenol E100" was adjusted so that the static surface tension of the ink to be obtained became a value shown in the lower stage of Table 1. The static surface tension of the inks was measured with an automatic surface tensiometer (product name: "DY-300," manufactured by Kyowa Interface Science Co., Ltd.). The amount of ion-exchanged water was set to such a balance that the total amount of the components of the inks became 100.0%. A numerical value applied to polyethylene glycol represents the number average molecular weight of the polyethylene glycol.

<Method of measuring Redispersibility Index of Ink>

2.0 Grams of the ink was loaded into a petri dish (inner diameter: 35 mm), and was left to stand under an environment at 30° C. and a relative humidity of 10% for 16 hours. Thus, a first residue was obtained. 1.2 Grams of the same ink was added to the petri dish and the first residue was redispersed by stirring the mixture for 30 seconds through the shaking of the petri dish with a hand. After the resultant had been left at rest for 60 seconds, a component having flowability was removed by tilting the petri dish and the component having flowability, which adhered to the edge of the petri dish, was wiped off with water-absorbing paper. Thus, a second residue was obtained. The mass A (g) of the resultant first residue and the mass B (g) of the resultant second residue were each measured, and the redispersibility index of the ink was calculated from the following equation (1). The calculated redispersibility indices of the respective inks are shown in the lower stage of Table 1.

$$\text{Redispersibility index} = B/A \tag{1}$$

TABLE 1

Compositions and characteristics of inks

| | Cyan ink | | | | | Magenta ink | | | | | | |
|---|---|---|---|---|---|---|---|---|---|---|---|---|
| | C1 | C2 | C3 | C4 | C5 | M1 | M2 | M3 | M4 | M5 | M6 | M7 |
| Pigment dispersion liquid 1 | 35.0 | 35.0 | 35.0 | | | | | | | | | |
| Pigment dispersion liquid 2 | | | | | | 50.0 | 50.0 | 50.0 | 50.0 | 50.0 | | |
| Pigment dispersion liquid 3 | | | | | | | | | | | 50.0 | |
| Pigment dispersion liquid 4 | | | | | | | | | | | | |
| Pigment dispersion liquid 5 | | | | | | | | | | | | |
| Pigment dispersion liquid 6 | | | | 30.0 | | | | | | | | |
| Pigment dispersion liquid 7 | | | | | | | | | | | | |
| Pigment dispersion liquid 8 | | | | | | | | | | | | |
| Pigment dispersion liquid 9 | | | | | | | | | | | | |
| Dye aqueous solution 1 | | | | | 50.0 | | | | | | | |
| Dye aqueous solution 2 | | | | | | | | | | | | 50.0 |
| Dye aqueous solution 3 | | | | | | | | | | | | |
| Resin aqueous solution 1 | 4.0 | 4.0 | 4.0 | 15.0 | | 2.5 | 2.5 | 2.5 | 2.5 | 2.5 | 2.5 | |
| Resin aqueous solution 2 | | | | | | 3.5 | 3.5 | 3.5 | 3.5 | 3.5 | 3.5 | |
| Resin aqueous solution 3 | | | | | | | | | | | | |
| Glycerin | 7.0 | 7.0 | 14.0 | 10.0 | 10.0 | 14.0 | 14.0 | 14.0 | 14.0 | 17.0 | 14.0 | 10.0 |
| 2-Pyrrolidone | | | | 5.0 | 5.0 | | | | | | | 5.0 |
| Triethylene glycol | 5.0 | 5.0 | 7.0 | 10.0 | 10.0 | 7.0 | 7.5 | 7.8 | 8.0 | 7.0 | 7.5 | 10.0 |
| Polyethylene glycol 1000 | 10.0 | 10.0 | 1.0 | 1.0 | 1.0 | 1.0 | 0.5 | 0.2 | | 1.0 | 0.5 | 1.0 |
| 1,2-Hexanediol | 1.0 | 1.0 | 1.0 | | | 1.0 | 1.0 | 1.0 | 1.0 | 1.0 | 1.0 | |
| 1,6-Hexanediol | 3.0 | 3.0 | 3.0 | | | 3.0 | 3.0 | 3.0 | 3.0 | | 3.0 | |
| Acetylenol E100 | 0.8 | 1.1 | 1.2 | 0.7 | 0.5 | 0.8 | 0.8 | 0.8 | 0.8 | 0.8 | 1.1 | 0.7 |
| Ion-exchanged water | 34.2 | 33.9 | 33.8 | 28.3 | 23.5 | 17.2 | 17.2 | 17.2 | 17.2 | 17.2 | 16.9 | 23.3 |
| Redispersibility index | 0.99 | 0.98 | 0.17 | 0.96 | 0.09 | 1.06 | 0.95 | 0.92 | 0.90 | 0.80 | 0.30 | 0.11 |
| Static surface tension (mN/m) | 35 | 33 | 33 | 35 | 35 | 35 | 35 | 35 | 35 | 35 | 33 | 35 |

| | Magenta ink | | | | Yellow ink | | | | | | | Black ink |
|---|---|---|---|---|---|---|---|---|---|---|---|---|
| | M8 | M9 | M10 | M11 | Y1 | Y2 | Y3 | Y4 | Y5 | Y6 | Y7 | K1 |
| Pigment dispersion liquid 1 | | | | | | | | | | | | |
| Pigment dispersion liquid 2 | | | 50.0 | 50.0 | | | | | | | | |
| Pigment dispersion liquid 3 | | | | | | | | | | | | |
| Pigment dispersion liquid 4 | | | | | 45.0 | 45.0 | 45.0 | | | 45.0 | 45.0 | |
| Pigment dispersion liquid 5 | | | | | | | | | | | | 40.0 |
| Pigment dispersion liquid 6 | | | | | | | | | | | | |
| Pigment dispersion liquid 7 | 50.0 | | | | | | | | | | | |

TABLE 1-continued

Compositions and characteristics of inks

| | | | | | | | | | | | | |
|---|---|---|---|---|---|---|---|---|---|---|---|---|
| Pigment dispersion liquid 8 | | 50.0 | | | | | | | | | | |
| Pigment dispersion liquid 9 | | | | | | | | | 40.0 | | | |
| Dye aqueous solution 1 | | | | | | | | | | | | |
| Dye aqueous solution 2 | | | | | | | | | | | | |
| Dye aqueous solution 3 | | | | | | | | 35.0 | | | | |
| Resin aqueous solution 1 | 15.0 | 15.0 | 6.0 | | | | | | 15.0 | | | 18.0 |
| Resin aqueous solution 2 | | | | 6.0 | 4.0 | 4.0 | 4.0 | | | | | |
| Resin aqueous solution 3 | | | | | | | | | | | | 10.0 |
| Glycerin | 10.0 | 10.0 | 14.0 | 14.0 | 14.0 | 14.0 | 14.0 | 10.0 | 10.0 | 12.0 | 12.0 | 13.0 |
| 2-Pyrrolidone | 5.0 | 5.0 | | | | | | 5.0 | 5.0 | | | |
| Triethylene glycol | 10.0 | 10.0 | 7.0 | 7.0 | 7.0 | 7.0 | 7.0 | 10.0 | 10.0 | 8.0 | 8.0 | 7.0 |
| Polyethylene glycol 1000 | 1.0 | 1.0 | 1.0 | 1.0 | 1.0 | 1.0 | 1.0 | 1.0 | 1.0 | 2.0 | 2.0 | 3.0 |
| 1,2-Hexanediol | | | 1.0 | 1.0 | 1.0 | 1.0 | 1.0 | | 1.5 | 1.0 | 1.0 | |
| 1,6-Hexanediol | | | 3.0 | 3.0 | 3.0 | 3.0 | 3.0 | | | 3.0 | 3.0 | 3.0 |
| Acetylenol E100 | 0.7 | 0.7 | 0.8 | 0.8 | 1.1 | 0.8 | 0.8 | 0.9 | 0.5 | 1.0 | 0.8 | 0.3 |
| Ion-exchanged water | 8.3 | 8.3 | 17.2 | 17.2 | 23.9 | 24.2 | 24.2 | 38.1 | 17.0 | 28.0 | 28.2 | 5.7 |
| Redispersibility index | 0.71 | 0.22 | 1.13 | 0.95 | 0.19 | 0.19 | 0.18 | 0.14 | 1.08 | 1.00 | 0.99 | 1.01 |
| Static sulface tension (mN/m) | 33 | 33 | 35 | 35 | 33 | 35 | 38 | 35 | 35 | 33 | 35 | 38 |

<Evaluation>

Inks whose kinds were shown in Table 2 were used and evaluated for the following items. In the evaluation of abrasion resistance to be described later, cases in which the total (total point) of a point in the column "5 Minutes after recording" and a point in the column "15 Minutes after recording" was "6 points," "5 points," "4 points," "3 points" and "2 points" were defined as acceptable levels, while a case in which the total was "1 point" was defined as an unacceptable level. The evaluation results are shown in Table 2. In Examples, the recording duty of a solid image recorded under such a condition that two ink droplets having a mass per droplet of 5 ng were applied to a unit region measuring 1/600 inch by 1/600 inch was defined as 100%.

(Abrasion Resistance)

An ink jet recording apparatus, which had main part configurations illustrated in FIG. 1 and FIG. 2, and had incorporated thereinto an ink supply system having a configuration illustrated in FIG. 3, was prepared. The sub tank 202 was such a form that a recording element substrate including the recording head 203 for ejecting an ink by applying thermal energy thereto was bonded to a housing formed of a thermoplastic resin. The recording head 203 is a recording head having ejection orifice arrays illustrated in FIG. 4. The length of the tube (ink supply tube 104) for connecting the main tank 201 and the sub tank 202 was set to 700 mm. After the first valve 206 and the second valve 207 had been actuated in conjunction with each other to close the ink supply tube 104 and the gas introduction tube 204, each of the inks was filled into the main tank 201 so that the ink supply system was filled with the ink. The inlet amount of the ink was set to 95% of the volume (g) of the main tank shown in Table 2. In each of Reference Examples 1 and 2, the following recording apparatus was used: a cartridge-shaped ink storage portion free of any ink inlet port was arranged on a carriage and a main tank was omitted. In Reference Example 3, a main tank having an ink inlet port arranged in a side surface of its lower portion was used. After that, the ink jet recording apparatus was left to stand under the conditions of a temperature of 40° C. and a humidity of 15% for 2 months. During the 2-month period, part of the pigment in the ink in the main tank 201 was settled.

After that, 10 g of the ink was sucked from an ejection orifice of the recording head with a pump. In Reference Example 3, before the suction of 10 g of the ink, 7.5 g of the ink was filled from the ink inlet port in the side surface of the lower portion of the main tank. The combination of the first ink and the second ink, and a recording method shown in Table 2 were adopted, and secondary color images each having a size measuring 2 cm by 2 cm were recorded at two sites by applying the respective inks in an overlapping manner to a recording medium so that the recording duty of the inks became 100%, that is, the total recording duty became 200%.

In Table 2, a case in which the second ink in the column "Ink to be recorded" is represented by "-" means that an image having a recording duty of 100% was recorded only with the first ink. In addition, the columns "Ejection orifice arrays 21 to 24" in the column "Kind of ink" in Table 2 correspond to the "ejection orifice arrays 21 to 24" in FIG. 4. Glossy paper (product name: "CANON PHOTO PAPER GLOSSY STANDARD SD-201," manufactured by Canon Inc.) was used as the recording medium. In Table 2, the terms "One-pass and zero-scan delay" and "One-pass and one-scan delay" in the column "Recording method" mean that recording was performed under the following conditions.

"One-pass and zero-scan delay": The inks are applied in the following order to the unit region of the recording medium by one main scan: the first ink is applied and then the second ink is applied.

"One-pass and one-scan delay": The first ink is applied to the unit region of the recording medium by a first main scan and the second ink is applied to the unit region having applied thereto the first ink by a scan next to the scan.

5 Minutes after the recording of the secondary color images and 15 minutes after the recording, the secondary color images and lens-cleaning paper having mounted thereon a weight having a surface pressure of 40 g/cm$^2$ were rubbed with each other three times so that the lens-cleaning paper passed through the tops of the secondary color images in the same direction. After that, whether or not the secondary color image portions peeled to expose the recording medium and the state of the contamination of the recording medium on the downstream side of the rubbing with the lens-cleaning paper due to a coloring material were visually observed, followed by the evaluation of the scratch resistance of each of the images in accordance with the following evaluation criteria.

3 points: The recording medium in the secondary color image portions was not exposed and no contamination was observed on the downstream side of the rubbing with the lens-cleaning paper.

2 points: The recording medium in the secondary color image portions was not exposed but contamination was observed on the downstream side of the rubbing with the lens-cleaning paper.

1 point: The recording medium was exposed in a region corresponding to less than 20% of the secondary color image portions.

0 points: The recording medium was exposed in a region corresponding to 20% or more of the secondary color image portions.

hence the ink loading amount is large. In Reference Example 1, a phenomenon in which the abrasion resistance of each of the images reduced did not occur because an ink having a high pigment concentration was removed by the operation of sucking a small amount of the ink. This example was poor in productivity because when a large amount of images were recorded, the ink storage portion needed to be replaced a plurality of times for recording the same number of images as those of the other examples. In addition, in Reference Example 2, the apparatus increased in size because the size of the cartridge was large and a mechanism for mounting the cartridge needed to be arranged. In Reference Example 3, after the ink jet recording apparatus had been left to stand for 2 months, the ink was filled from the lower portion of the

TABLE 2

Evaluation conditions and evaluation results

| | | Kind of ink | | | Ink to be recorded | | Ink inlet amount (g) | Recording Method | Scratch resistance | | |
|---|---|---|---|---|---|---|---|---|---|---|---|
| | | Ejection orifice array 21 | Ejection orifice array 22 | Ejection orifice array 23 | Ejection orifice array 24 | First ink | Second ink | | | Total | 5 Minutes after recording | 15 Minutes after recording |
| Example | 1 | K1 | Y7 | C3 | M1 | M1 | C3 | 150 | One-pass and one-scan delay | 5 | 2 | 3 |
| | 2 | K1 | Y1 | C1 | M1 | M1 | Y1 | 150 | One-pass and one-scan delay | 5 | 2 | 3 |
| | 3 | K1 | Y7 | C3 | M10 | M10 | C3 | 150 | One-pass and one-scan delay | 5 | 2 | 3 |
| | 4 | K1 | Y1 | C1 | M10 | M10 | Y1 | 150 | One-pass and one-scan delay | 5 | 2 | 3 |
| | 5 | K1 | Y7 | C3 | M11 | M11 | C3 | 150 | One-pass and one-scan delay | 5 | 2 | 3 |
| | 6 | K1 | Y7 | C3 | M11 | M11 | Y1 | 150 | One-pass and one-scan delay | 5 | 2 | 3 |
| | 7 | K1 | Y7 | C1 | M6 | C1 | M6 | 150 | One-pass and one-scan delay | 5 | 2 | 3 |
| | 8 | K1 | Y1 | C1 | M1 | C1 | Y1 | 150 | One-pass and one-scan delay | 5 | 2 | 3 |
| | 9 | K1 | Y7 | C3 | M1 | Y7 | C3 | 150 | One-pass and one-scan delay | 5 | 2 | 3 |
| | 10 | K1 | Y7 | C1 | M6 | Y7 | M6 | 150 | One-pass and one-scan delay | 5 | 2 | 3 |
| | 11 | K1 | Y7 | C4 | M8 | C4 | M8 | 150 | One-pass and one-scan delay | 5 | 2 | 3 |
| | 12 | K1 | Y5 | C1 | M8 | Y5 | M8 | 150 | One-pass and one-scan delay | 5 | 2 | 3 |
| | 13 | K1 | Y7 | C4 | M9 | C4 | M9 | 150 | One-pass and one-scan delay | 5 | 2 | 3 |
| | 14 | K1 | Y5 | C1 | M9 | Y5 | M9 | 150 | One-pass and one-scan delay | 5 | 2 | 3 |
| | 15 | K1 | Y7 | C3 | M1 | K1 | C3 | 150 | One-pass and one-scan delay | 5 | 2 | 3 |
| | 16 | K1 | Y7 | C1 | M6 | K1 | M6 | 150 | One-pass and one-scan delay | 5 | 2 | 3 |
| | 17 | K1 | Y1 | C1 | M1 | K1 | Y1 | 150 | One-pass and one-scan delay | 5 | 2 | 3 |
| | 18 | K1 | Y7 | C3 | M4 | M4 | C3 | 150 | One-pass and one-scan delay | 4 | 1 | 3 |
| | 19 | K1 | Y7 | C3 | M3 | M3 | C3 | 150 | One-pass and one-scan delay | 4 | 1 | 3 |
| | 20 | K1 | Y7 | C3 | M2 | M2 | C3 | 150 | One-pass and one-scan delay | 5 | 2 | 3 |
| | 21 | K1 | Y6 | C1 | M1 | M1 | Y6 | 150 | One-pass and one-scan delay | 5 | 2 | 3 |
| | 22 | K1 | Y7 | C1 | M1 | M1 | C2 | 150 | One-pass and one-scan delay | 5 | 2 | 3 |
| | 23 | K1 | Y7 | C2 | M2 | M2 | C2 | 150 | One-pass and one-scan delay | 5 | 2 | 3 |
| | 24 | K1 | Y7 | C3 | M1 | M1 | C3 | 150 | One-pass andzero-scan delay | 4 | 1 | 3 |
| | 25 | K1 | Y2 | C1 | M1 | M1 | Y2 | 150 | One-pass and one-scan delay | 4 | 1 | 3 |
| | 26 | K1 | Y3 | C1 | M1 | M1 | Y3 | 150 | One-pass and one-scan delay | 4 | 1 | 3 |
| | 27 | K1 | Y1 | C1 | M4 | M4 | Y1 | 150 | One-pass andzero-scan delay | 3 | 1 | 2 |
| | 28 | K1 | Y3 | C1 | M4 | M4 | Y3 | 150 | One-pass andzero-scan delay | 2 | 0 | 2 |
| Comparative Example | 1 | K1 | Y1 | C1 | M5 | M5 | Y1 | 150 | One-pass and one-scan delay | 1 | 0 | 1 |
| | 2 | K1 | Y7 | C3 | M1 | C3 | M1 | 150 | One-pass and one-scan delay | 1 | 0 | 1 |
| | 3 | K1 | Y1 | C1 | M1 | Y1 | M1 | 150 | One-pass and one-scan delay | 1 | 0 | 1 |
| | 4 | K1 | Y7 | C1 | M6 | M6 | C1 | 150 | One-pass and one-scan delay | 1 | 0 | 1 |
| | 5 | K1 | Y1 | C1 | M1 | Y1 | C1 | 150 | One-pass and one-scan delay | 1 | 0 | 1 |
| | 6 | K1 | Y7 | C3 | M1 | C3 | Y7 | 150 | One-pass and one-scan delay | 1 | 0 | 1 |
| | 7 | K1 | Y7 | C1 | M6 | M6 | Y7 | 150 | One-pass and one-scan delay | 1 | 0 | 1 |
| | 8 | K1 | Y7 | C4 | M8 | M8 | C4 | 150 | One-pass and one-scan delay | 1 | 0 | 1 |
| | 9 | K1 | Y5 | C1 | M8 | M8 | Y5 | 150 | One-pass and one-scan delay | 1 | 0 | 1 |
| Reference Example | 1 | K1 | Y1 | C3 | M5 | M5 | Y1 | 30 | One-pass and one-scan delay | 5 | 2 | 3 |
| | 2 | K1 | Y1 | C3 | M5 | M5 | Y1 | 150 | One-pass and one-scan delay | 1 | 0 | 1 |
| | 3 | K1 | Y7 | C3 | M1 | C3 | M1 | 150 | One-pass and one-scan delay | 5 | 2 | 3 |
| | 4 | K1 | Y4 | C5 | M7 | M7 | C5 | 150 | One-pass and one-scan delay | 6 | 3 | 3 |
| | 5 | K1 | Y4 | C5 | M7 | M7 | Y4 | 150 | One-pass and one-scan delay | 6 | 3 | 3 |
| | 6 | K1 | Y1 | C1 | M5 | M5 | — | 150 | One pass | 5 | 2 | 3 |

Reference Examples 1 and 2 are each an example in which the cartridge-type ink storage portion free of any openable and closable ink inlet port was used. While Reference Example 1 is an example in which the volume of the ink storage portion is small and hence the ink loading amount is small, Reference Example 2 is an example in which the volume of the ink storage portion is large and main tank. Accordingly, the ink increased in pigment concentration, which was present in the lower portion of the main tank, was diluted and stirred. Accordingly, in Reference Example 3, as can be seen from comparison with Comparative Example 2 that was a control example, the abrasion resistance of each of the images did not reduce. Reference Examples 4 and 5 are each an example in which an ink containing a dye as a coloring material was used. In each of Reference Examples 4 and 5, the abrasion resistance of each of the images was better than those of the other examples and comparative examples because the dye permeated into the recording medium. Reference Example 6 is an example in which the primary color image having a recording duty of 100% was recorded. The abrasion resistance of the primary color image hardly reduced probably because the ink application amount of the primary color image recorded in Reference Example 6 was smaller than the ink application amounts of the secondary color images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-203432, filed Dec. 8, 2020, and Japanese Patent Application No. 2021-185394, filed Nov. 15, 2021, which are hereby incorporated by reference herein in their entirety.

What is claimed is:

1. An ink jet recording method for recording an image with an ink jet recording apparatus comprising:
   a plurality of aqueous inks, with each each aqueous ink of the plurality of aqueous inks comprising a pigment;
   an ink storage portion having an ink inlet port arranged in an upper portion thereof, the ink storage portion being configured to store each aqueous ink of the plurality of aqueous inks;
   a recording head having formed therein an ejection orifice configured to eject each aqueous ink of the plurality of aqueous inks supplied from the ink storage portion; and
   an ink supply path configured to supply each aqueous ink of the plurality of aqueous inks from the ink storage portion to the recording head,
   the recording being performed by applying each aqueous ink of the plurality of aqueous inks ejected from the ejection orifice to a recording medium,
   wherein the plurality of aqueous inks includes a first ink to be applied earlier to the recording medium and a second ink to be applied later to the recording medium so as to overlap at least part of a region in the recording medium having applied thereto the first ink, and
   wherein the first ink has a redispersibility index calculated by the following equation (1) of 0.90 or more:

$$\text{redispersibility index} = B/A \qquad (1)$$

where
   A represents a mass (g) of a first residue obtained by leaving 2.0 g of the first ink to stand under an environment at 30° C. and a relative humidity of 10% for 16 hours, and
   B represents a mass (g) of a second residue obtained by adding 1.2 g of the first ink to the first residue, stirring the mixture for 30 seconds, leaving the mixture at rest for 60 seconds, and then removing a component having flowability.

2. The ink jet recording method according to claim 1, wherein the first ink has a redispersibility index of 0.95 or more.

3. The ink jet recording method according to claim 1, wherein a static surface tension ($\gamma_1$) of the first ink and a static surface tension ($\gamma_2$) of the second ink satisfy a relationship of $\gamma_1 > \gamma_2$.

4. The ink jet recording method according to claim 1,
   wherein the recording head is a recording head of a serial type, and
   wherein a scan delay is performed during a time period from the application of the first ink to the application of the second ink.

5. An ink jet recording apparatus comprising:
   a plurality of aqueous inks, with each aqueous ink of the plurality of aqueous inks comprising a pigment;
   an ink storage portion having an ink inlet port arranged in an upper portion thereof, the ink storage portion being configured to store each aqueous ink of the plurality of aqueous inks;
   a recording head having formed therein an ejection orifice configured to eject each aqueous ink of the plurality of aqueous inks supplied from the ink storage portion; and
   an ink supply path configured to supply each aqueous ink of the plurality of aqueous inks from the ink storage portion to the recording head,
   wherein the plurality of aqueous inks includes a first ink to be applied earlier to the recording medium and a second ink to be applied later to the recording medium so as to overlap at least part of a region in the recording medium having applied thereto the first ink, and
   wherein the first ink has a redispersibility index calculated by the following equation (1) of 0.90 or more:

$$\text{redispersibility index} = B/A \qquad (1)$$

where
   A represents a mass (g) of a first residue obtained by leaving 2.0 g of the first ink to stand under an environment at 30° C. and a relative humidity of 10% for 16 hours, and
   B represents a mass (g) of a second residue obtained by adding 1.2 g of the first ink to the first residue, stirring the mixture for 30 seconds, leaving the mixture at rest for 60 seconds, and then removing a component having flowability.

* * * * *